United States Patent [19]
Underbrink

[11] Patent Number: 6,114,992
[45] Date of Patent: *Sep. 5, 2000

[54] SATELLITE ACQUISITION AND MEASUREMENT SYSTEM AND PROCESS

[75] Inventor: Paul A. Underbrink, Lake Forest, Calif.

[73] Assignee: Conexant Systems, Inc., Newport Beach, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/862,046

[22] Filed: May 22, 1997

[51] Int. Cl.$^7$ .................................................. H04B 7/185
[52] U.S. Cl. ........................................................ 342/357.15
[58] Field of Search ...................... 342/357, 352, 342/357.15, 357.13; 701/213, 217

[56] References Cited

U.S. PATENT DOCUMENTS

| | | | |
|---|---|---|---|
| 5,036,329 | 7/1991 | Ando | 342/357 |
| 5,225,842 | 7/1993 | Brown et al. | 342/357.09 |
| 5,323,164 | 6/1994 | Endo | 342/357 |
| 5,408,239 | 4/1995 | Endo | 342/352 |
| 5,418,538 | 5/1995 | Lau | 342/357.15 |
| 5,552,794 | 9/1996 | Colley et al. | 342/357 |
| 5,594,453 | 1/1997 | Rodal et al. | 342/357 |
| 5,654,718 | 8/1997 | Beason et al. | 342/357.15 |

*Primary Examiner*—Gregory C. Issing
*Attorney, Agent, or Firm*—Thomas, Kayden, Horstemeyer & Risley, L.L.P.

[57] ABSTRACT

A satellite signal acquisition and measurement apparatus and process has the capability of quickly acquiring multiple satellite signals and performing measurements based on the acquired signal (such as time and range measurements) with a high level of computational efficiency. A sample comparison process is carried out, wherein a sample length of a satellite's signal is received and compared with all possible sample lengths of each satellite's code. However, instead of comparing the satellite signal sample length with each possible sample length at each possible frequency, a modified sample comparison approach is carried out. That is, after at least one satellite has been acquired, the frequency of the next satellite signal to be acquired is assumed to be within a limited range of frequencies determined from statistical probabilities based on the frequency of the previous signal acquisition(s). By narrowing the range of frequencies for the next satellite signal to be acquired, the modified process minimizes the number of comparison computations required to identify the received signal sample length. Such satellite acquisition apparatus may operate independent of navigational calculation functions to acquire as many satellite signals as possible, as quickly as possible.

14 Claims, 2 Drawing Sheets

SATELLITE ACQUISITION AND MEASUREMENT SYSTEM AND PROCESS

FIELD OF THE INVENTION

The present invention relates, generally, to satellite acquisition and measurement devices and processes for satellite positioning and navigation systems and, in preferred embodiments, to such systems and processes which are capable of providing relatively fast acquisition and measurement speeds with minimal computational complexity and in further preferred embodiments, to such systems and processes which are capable of performing satellite acquisition processes independent of navigation computations, yet with improved computational efficiency over standard sample comparison approaches.

BACKGROUND OF THE INVENTION

The development of satellite tracking technology in the 1950's and atomic clock technology in the 1960's and 1970's led to the development of navigation (and global positioning) systems using satellite and clock signals. A generalized method of satellite navigation and global positioning is shown with reference to FIG. 1, wherein a satellite 10 is shown at a known distance $R_S$ from the center C of the Earth 12. FIG. 1 also shows a global positioning system (GPS) receiver location 14 on the Earth's surface, at a distance $R_E$ from the center C.

The distances $R_S$ and $R_E$ are known or can be determined at least within a few meters. The range X is the distance from the receiver location 14 and the satellite 10, which can be measured and calculated electronically from satellite transmitted signals. This measuring and calculating process involves the use of synchronized clocks, one at the satellite 10 and one at the receiver location 14 and the transmission of a clock-based signal from the satellite for comparison with a replicate clock-based signal from the synchronized clock at the receiver location 14. An estimate of the range X can be determined from the phase difference between the signal received from the satellite and the signal at the receiver location.

Because the $R_S$ and $R_E$ sides of the triangle shown in FIG. 1 are known, once the range X is calculated, the solved range defines a range line (or line-of-position) on the surface of the Earth upon which the receiver location 14 must be positioned. At least two of such lines are needed to determine a two-dimensional identification (or fix) of the receiver location 14 on the Earth's surface, using the range line approach. At least three of such lines are needed to determine a third dimension, such as altitude or depth. However, this generalized example assumes that the range X is calculated with perfect accuracy. In real-world applications, on the other hand, range calculations require a substantial amount of calculations to account for a number of variables, including Doppler effects, receiver clock imprecisions, and atmospheric delays.

Clock errors may be estimated by forming a third range line for a two-dimensional fix or a fourth range line for a three-dimensional fix. This can be demonstrated, for example, with reference to FIG. 2, wherein three satellites are used to provide an estimated two-dimensional fix and an estimated clock error.

In FIG. 2, the pseudo-range X of three satellite positions is illustrated as pseudo-range radii $R_{X1}$, $R_{X2}$ and $R_{X3}$. The pseudo-range radii $R_{X1}$, $R_{X2}$ and $R_{X3}$ do not meet in a single point, but instead enclose the shaded region shown in FIG. 2. However, a value $\Delta r$ can be determined that, when removed from (or added to) the pseudo-ranges, will cause the radii to meet at a point 16. If the error between the user's clock and the space vehicle clock is the same for each satellite and if other effects on range determinations, such as Doppler effects, are the same for each satellite, then the point 16 is the user's position. However, in practice, the clock errors and Doppler effects differ for different satellites and satellite positions such that the value $\Delta r$ is actually an estimate of the range error caused by clock error and the position 16 is actually an estimate of the user's position, based on these estimated error values.

In general, the accuracy of the position determination calculations tend to increase as more range lines are formed. In a single satellite arrangement, multiple range lines are formed over a period of time, as the range X changes with relative motion between the satellite and the location 14. Multiple satellites (for example, the NAVSTAR system) can increase the processing speed by providing the ability to obtain multiple range lines at any one time.

For example, NAVSTAR includes multiple satellites positioned in respective known orbits, such that from 6 to 11 satellites are visible at 5 degrees or more above the horizon to a user located anywhere in the world. Atomic clock technology employed in the satellites provides precision timing for satellite transmitted signals. Each satellite transmits a signal modulated with a unique spread spectrum code for timing, identification, and other data such as status data and parameters for clock correction.

GPS receivers are typically designed to search for and identify all NAVSTAR satellites within range for making navigational calculations. At least four are generally required for three-dimensional tracking, as discussed above. However, with multiple satellite signals, the receiver complexity (and time) required to discriminate and identify each satellite's signal, and account for Doppler effects, clock error and other error factors increases significantly. Acquisition of the requisite number of satellites can involve relatively complex calculation processes dependent upon navigation calculations and satellite signal measurements. In typical conventional receivers, navigation and measurement functional parts are intertwined, in that operation of the receiver requires that the measurement engine be provided data from the navigation engine for continued satellite acquisitions.

One example of a global positioning method and apparatus for a GPS receiver system is described in co-assigned U.S. Pat. No. 5,552,794 to Colley et al., issued Sep. 3, 1996 (incorporated herein by reference). Systems such as described in the Colley et al. patent require both navigation and measurement means (engines), which are operationally dependent upon each other, to acquire the requisite satellite signals to determine (or fix) a user's position. In particular, as each satellite signal is acquired, Doppler measurements are made to determine the rate of change of the range. Navigation calculations are carried out to determine navigational coordinates representing a corresponding "isodop line" over the globe (a line of positions at which the range rate of change, or Doppler measurements, are constant), defining hypothetical receiver positions along the line. By placing the receiver's hypothetical position on various points along the isodop, other satellites that may be visible from the isodop points may be acquired to determine further isodop lines.

This interdependent operation of navigation calculations and measurement functions can provide relatively accurate position calculations, however, at the cost of significant computational complexity and time. In many potential satellite positioning system applications, it would be desirable to minimize complexity, for purposes such as minimizing cost, power consumption, or size. Minimized computational complexity and time would benefit a number of potential fields of applications for satellite positioning systems, including, but not limited to, animal or personnel locating and tracking systems, water current and tide tracking systems, vehicle locating and tracking system, inventory or package locating and tracking systems or the like.

SUMMARY OF THE DISCLOSURE

Therefore, preferred embodiments of the present invention provide a satellite signal acquisition and measurement apparatus and process capable of quickly acquiring multiple satellite signals with a high level of computational efficiency. A sample comparison process is carried out, wherein a sample of a received satellite signal is compared with all possible samples of corresponding length of each possible satellite code. Normally, to take into account Doppler effects and imprecisions in the receiver electronics (e.g., an imprecise receiver oscillator), it would be necessary to carry out the sample comparison process for each possible sample length at each possible frequency. However, according to preferred embodiments of the present invention, a modified sample comparison process is carried out wherein, after at least one satellite has been acquired, the frequency of the next satellite signal to be acquired is assumed to be within a limited range of frequencies determined from statistical probabilities based on the frequency of the previous signal acquisition(s). By narrowing the range of frequencies for the next satellite signal to be acquired, the modified process minimizes the number of comparisons required to identify the received signal sample length and, thus, minimizes the computational time and/or requisite hardware.

Further preferred embodiments of the present invention are directed to such satellite acquisition apparatus (for example, in the form of a module, chip or the like) which may operate independent of navigational calculation functions to acquire as many satellite signals as possible, as quickly as possible. Yet further preferred embodiments are directed to such a system of such modules, wherein each receiver module includes a transmitter for transmitting satellite acquisition information (for example, satellite identification and range data) to a central navigation station located remotely with respect to each receiver module. Because of the capability to operate without navigation engine input, the receiver modules are preferably devoid of a navigation engine. Therefore, module size and cost may be further minimized, which can make a number of tracking and positioning system applications possible, including, but not limited to, animal or personnel locating and tracking systems, water current and tide tracking systems, vehicle locating and tracking system, inventory or package locating and tracking systems or the like.

In yet further preferred embodiments, the satellite acquisition apparatus and process is able to accept data from a navigation engine, when available, to improve system performance. Such data may be transmitted from a remotely located central navigation station. In further embodiments, such data may be provided from any suitable source, including a dedicated navigation engine electrically coupled to the acquisition apparatus. Yet further preferred embodiments include means or steps for quickly re-acquiring previously acquired satellites upon power on.

BRIEF DESCRIPTION OF THE DRAWINGS

The detailed description will be made with reference to the accompanying drawings, wherein like numerals designate corresponding parts in the several figures.

DETAILED DESCRIPTION OF PREFERRED EMBODIMENTS

Figure 1:
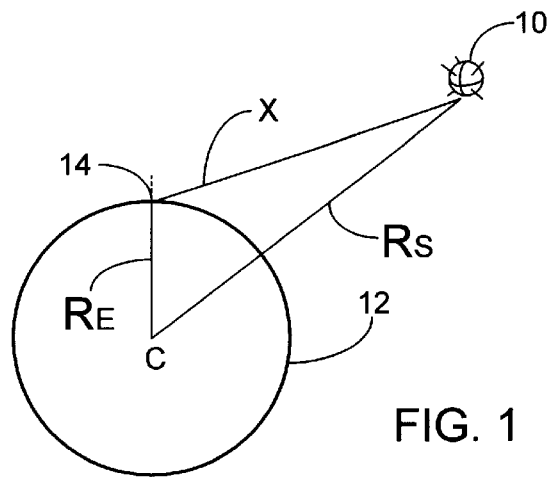
FIG. 1 is a two-dimensional representation of a single satellite system.
Figure 2:
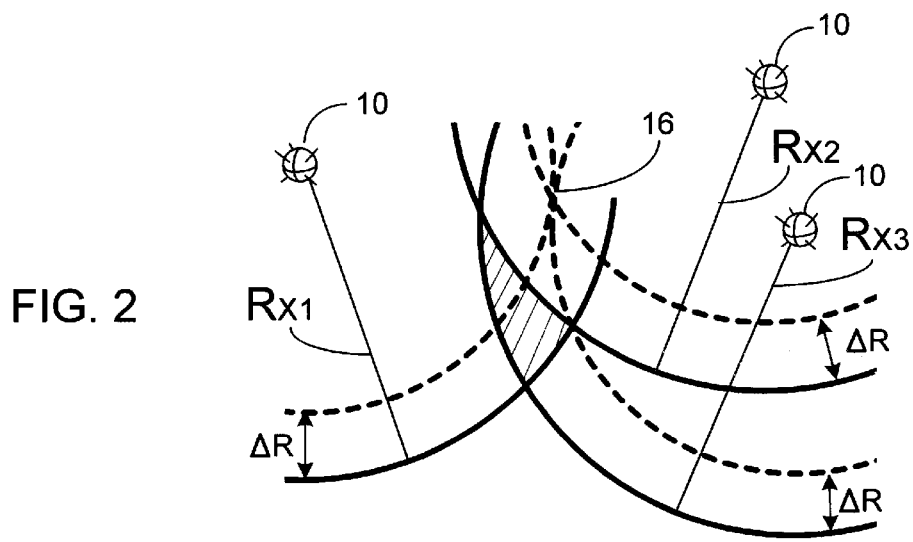
FIG. 2 is a two dimensional representation of positioning calculations provided by a global positioning system employing three acquired satellite signals.

The following detailed description is of the best presently contemplated mode of carrying out the invention. This description is not to be taken in a limiting sense, but is made merely for the purpose of illustrating the general principles of embodiments of the invention. The scope of the invention is best defined by the appended claims.

The present invention relates, generally, to satellite acquisition and measurement devices and processes for satellite positioning and navigation systems and processes. Preferred embodiments of the present invention provide a satellite signal acquisition apparatus and/or process for quickly acquiring multiple satellite signals with a high level of computational efficiency, using a modified sample comparison process as described herein. Further preferred embodiments of the present invention are directed to such satellite acquisition and measurement apparatus (for example, in the form of a module, chip or the like) which may operate to acquire and measure satellite signals independent of navigational calculation functions to acquire as many satellite signals as possible, as quickly as possible. In yet further preferred embodiments, the satellite acquisition apparatus and process is able to accept data from a navigation engine, when available, to improve system performance. Yet further preferred embodiments include means or steps for quickly re-acquiring previously acquired satellites upon power on.

Once a satellite signal is identified, timing information (such as satellite transmission time) may be obtained from the signal. As described above, the difference between transmission time and reception time can be used to determine a pseudo-range measurement of the satellite. The pseudo-range measurement is affected by Doppler effects and clock synchronization errors, for example, resulting from an imprecise receiver clock. Doppler effects and receiver clock errors may be estimated, and accounted for, to some extent, in the range calculations. However, estimation errors can result in significant imprecisions in the range determination.

In view of such range determination imprecisions, the above-cited Colley et al. patent proposes a system based on "range rate" measurements, which are less susceptible to clock synchronization errors than "range" determinations. However, as noted above, Colley et al.'s system involves an interdependence of satellite signal measurement functions and navigational calculation functions, which can require an undesirable high degree of computational complexity and hardware complexity.

Preferred embodiments of the present invention either alternatively address or further address the receiver clock imprecisions by providing a satellite signal acquisition apparatus and process for quickly acquiring multiple satellite signals with a high level of computational efficiency. More particularly, preferred embodiments of the present invention are directed to a satellite acquisition apparatus (for example, in the form of a module, chip or the like) which may operate independent of navigational calculation functions to acquire as many satellite signals as possible, as quickly as possible. In further preferred embodiments, the satellite acquisition apparatus and process is able to accept data from a navigation engine, when available, to improve system performance. The acquired satellite signals may be stored for later access by a navigation engine (for position calculations) or may be transmitted to a navigation engine, e.g., located remote from or within the GPS receiver.

The capability of performing satellite acquisition functions independent of the navigation calculations, according to preferred embodiments, allows the same satellite signal acquisition apparatus to be used with a wide variety of custom navigation engines. When used in conjunction with a range-based navigation engine, multiple satellite signals acquired by the apparatus or method of preferred embodiments, can increase the precision of range-based calculations by allowing the generation of further range lines, as discussed in the background section herein. Even when used in conjunction with a range-rate-based navigation process as described by Colley et al., multiple satellite signals acquired by further preferred embodiments can increase the precision by allowing the generation of additional range rate lines.

Figure 3:
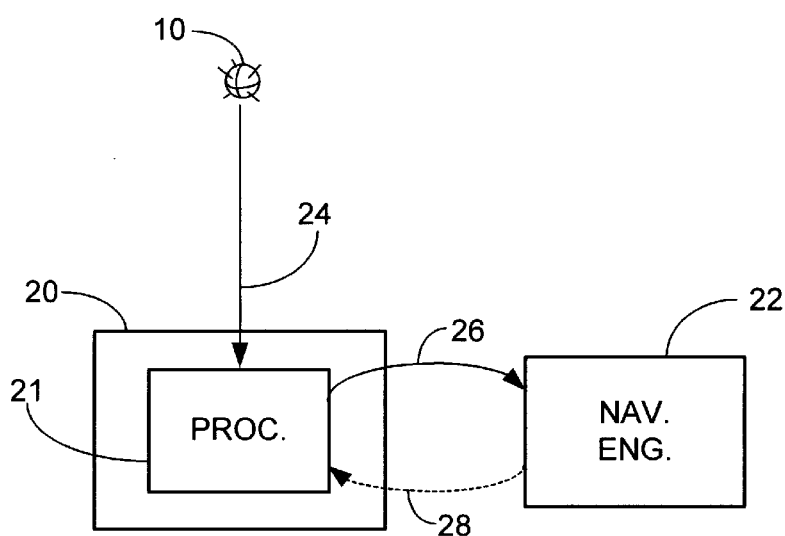
FIG. 3 is a block diagram of a receiver system according to a preferred embodiment of the present invention, in operation with a satellite and a navigation engine.

FIG. 3 shows a representation of a GPS receiver 20, according to a preferred embodiment of the present invention, formed as a chip or module separate from a navigation engine 22. The receiver chip 20 includes processor means 21 programmed to acquire satellite signals 24, for example, according to the process discussed below, and provide acquired satellite signal data 26 to the navigation engine 22 for calculation of navigational positions.

The capability of performing satellite acquisition functions in a module, chip or the like, separate from a navigation engine, allows for practical usage of GPS systems in a wide variety of heretofore impractical applications. For example, a chip 20 may be provided with a wireless transmitter device (not shown) for communication with a receiver device (not shown) operating with the navigation engine 22, such that the chip 20 and navigation engine 22 may be located remote from each other. The receiver system clock (not shown) may even be located remotely with respect to the chip 20. This would allow the relatively costly navigation engine and other components to be located, for example, in a base station, while relatively cost efficient, power efficient chips 20 may be located on, for example, modules in animal or personnel tracking tags, buoys, vehicles tracking, package or inventory tracking tags or the like. The separation of navigation engine functions from the satellite acquisition device and process can render practical a multitude of GPS applications that heretofore were impractical due to cost, size and power consumption concerns.

As noted above, satellite signals are each modulated with a spread spectrum code which, for each satellite, includes a unique, repeating code for identification and timing. By virtue of atomic clock technology, the satellite signal frequency for each satellite is relatively precise and each portion of a satellite's code length accurately corresponds to a portion of the repeat period. Thus, by identifying a portion of the transmitted satellite code, the particular time within the repeat period in which that portion of the code was transmitted may be determined. The code is also modulated with data identifying the transmission time of each repeat period.

According to preferred embodiments of the present invention, identification involves a process wherein, after a first satellite is acquired, a "modified sample comparison process" is carried out to acquire each additional satellite According to such a process, each acquired satellite signal provides data which is used to improve the efficiency and reduce the time required to acquire each additional satellite signal.

Upon initiation of the process (e.g., "cold start"), a first satellite may be acquired (satellite code is received and identified) by any number of means. If no satellite signal information has been obtained or is provided to the receiver, the receiver process preferably begins as an unmodified sample comparison procedure, wherein a sample of a satellite signal (which includes a sample length of a satellite's identification code) is received and evaluated. A comparison is carried out to compare the sample of the received satellite code with all possible samples of the same sample length of each possible satellite code. In the NAVSTAR system, there are presently 32 possible distinct satellite codes. Because of the number of possible samples (sample lengths of all satellite codes), the comparison process involves a fair degree of computational complexity and computational time.

Moreover, the satellite signal, as received by a receiver, has been affected by Doppler effects. Also, due to imprecision in the receiver electronics (e.g., an imprecise reference signal oscillator), comparison functions may involve imprecise reference signal frequencies. Thus, the process of identifying the received signal must take into account the possible effects that these variables may have on signal frequencies. This adds further comparisons and complexities to the signal identification process, in that the comparison process must also take into account each possible sample portion at each possible frequency.

In practice, this may be carried out, for example, by generating spread spectrum sequence samples for comparison with the received satellite signal sample, as discussed above. However, the received sample is then compared to each generated sample at each possible frequency until a match is found. As a result of the match, the receiver identifies (and acquires) the satellite that transmitted the signal and the frequency at which the signal was received. Also, as noted above, the satellite code signal is modulated with timing information for purposes of performing range determinations, in accordance with well known range determination procedures. Thus, once a satellite's code and a reception frequency has been identified and range calculations have been performed, the satellite has been "acquired" and further satellites acquisitions may be sought.

In preferred embodiments, the processor means 21 of the receiver chip 20 is programmed to carry out a modified sample comparison approach. According to such a modified approach, on cold start, a first satellite acquisition may be made according to the above-discussed sample comparison process to determine the signal frequency of the first received satellite signal. Alternatively, the receiver chip may be pre-calibrated for a cold start frequency value, or may receive a frequency calibration from another source, or may re-acquire previously acquired satellites (as the first satellite acquisition) as discussed below.

Once at least one satellite signal is acquired (or otherwise provided, such as via a pre-calibrated parameter), a channel of the receiver is preferably devoted to receiving the acquired satellite signal and updating frequency and timing information. In addition, one (or more) further receiver channel(s) is (are) used to continue the satellite acquisition process with a modified sample comparison process. In particular, predictions are made regarding the expected received signal frequency for the next acquisition, based on the frequency of the previously acquired satellite signal(s) and the known (or estimated) maximum changes that can occur due to Doppler and other frequency altering effects. Such predictions are based on statistical probability that the received signal frequency for the next satellite acquisition is within a certain range of a signal frequency based on the frequency (or frequencies) of the previously acquired satellite signal(s).

Figure 4:
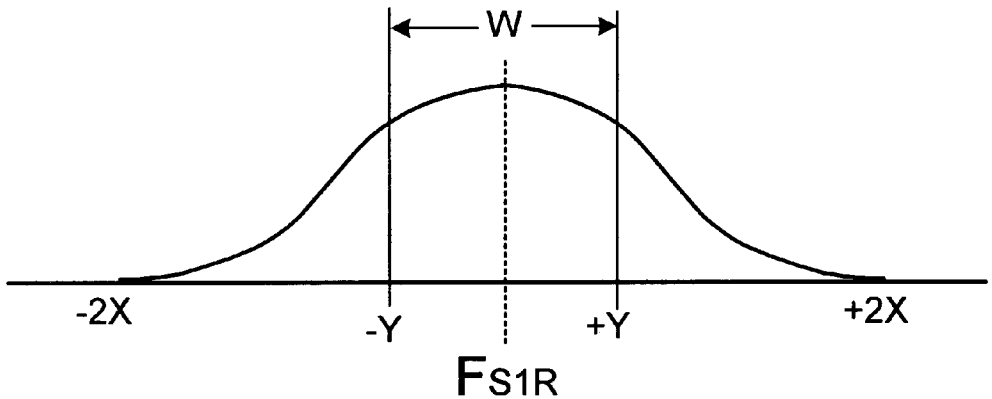
FIG. 4 is a graph representing probability versus frequency.

FIG. 4 is a generalized example of a graph representing a probability distribution, comprising the probability (vertical axis) versus the frequency (horizontal axis) of the next satellite signal to acquire, based on the signal frequency $F_{S1R}$ of the first received satellite signal and the known or estimated maximum potential affect imposed by Doppler effects and receiver clock imprecisions (represented by x). The statistical information represented in the graph may be derived from real-life trials or from computer simulations or the like.

According to preferred embodiments of the present invention, during acquisition of the second (and further) satellite signal(s), the sample comparison approach is modified, such that comparison samples generated for comparison with a received satellite signal sample are not compared at all possible frequencies of the generated sample. Instead, a window W, is selected to define the portion of the range of potential frequencies representing the highest probability values based on the frequency of the signal (or signals) received in one or more prior acquisitions. Comparisons are then performed (according to the above-discussed sample comparison approach), but only for generated sample frequencies within the range of the window W. By selecting the window width W appropriately, the likelihood that the next received satellite signal will fall within the frequency window W may be very high, while the exclusion of frequencies outside of the window W from the sample comparisons will likely substantially reduce the number of comparisons (and, thus, the computational complexity) required to acquire the satellite signal. Factors to consider when selecting a window width for a particular application of use include the benefits of reducing comparisons and the ability to tolerate non-matches. Once a match is found for the second satellite acquisition, a further acquisition uses the modified sample comparison process, however, modified with information relating to the first two acquisitions.

Figure 5:
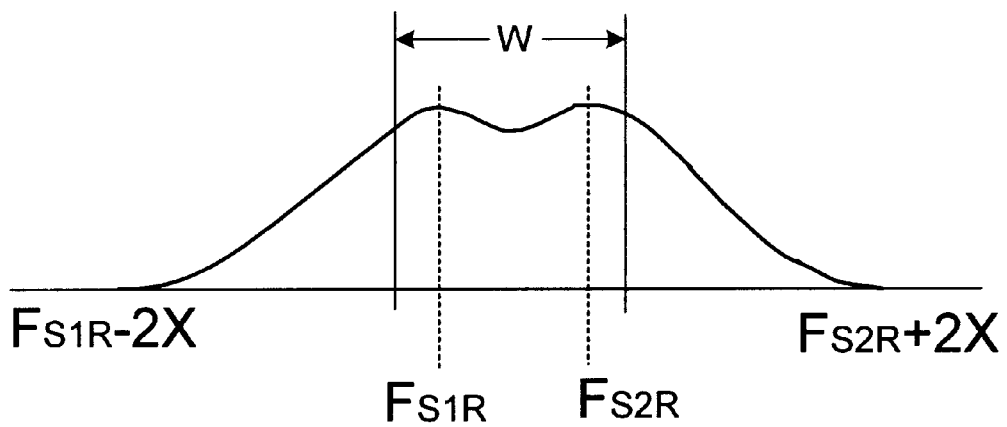
FIG. 5 is a graph representing the probability versus frequency, with two acquired satellite signals.

FIG. 5 is a generalized example of a graph representing a probability distribution based on the signal frequency $F_{S1R}$ of the first received satellite signal, the signal frequency $F_{S2R}$ of the second received satellite signal, and the known or estimated maximum potential affect imposed by Doppler effects and receiver clock imprecisions on each of these signals. The process is carried on for each additional acquisition, with the frequency range for the comparison process in each additional acquisition being limited by a window determined by frequency information derived from previously acquired satellites.

With each acquisition, the frequency estimation for the next acquisition should become more accurate. As such, the width of the window W may be decreased with each acquisition, to further minimize the number of comparisons (and, thus, the computational complexity) required to acquire further satellite signals. Accordingly, it is possible to acquire multiple satellite signals, without requiring naviga-tional computations, yet with a reduced number of computations (and reduced computational complexity) relative to an un-modified sample comparison approach for each acquisition.

While preferred embodiments of the present invention are capable of acquiring multiple satellite signals without input from a navigation engine, further preferred embodiments are capable of receiving data (shown as broken line 28 in FIG. 3) from a navigation engine (or other suitable source) for improving system accuracy and/or acquisition speed. Such data may include, but is not limited to, known or estimated satellite locations, Doppler effects, clock uncertainties, time or clock data or the like. In such preferred embodiments, the receiver chip 20 employs any available data that can be used to simplify, improve the precision of or increase the speed of acquiring further satellite signals, however, is capable of operating only with data received from the satellite signals.

In further preferred embodiments, the receiver reference oscillator (not shown) is adjusted to correct for local time reference uncertainty. Such adjustments may be made based on delay values provided by a navigation engine or, alternatively, may be based on estimated values. For example, based on an assumption that all satellites are evenly spaced from each other, the average satellite delay is approximately 76 milliseconds. Thus, by adding a bias value to each measurement, the oscillator frequency may be adjusted to a delay value of, for example, 76 milliseconds.

In yet further preferred embodiments, the acquisition process may be further accelerated by re-acquiring previously acquired satellites. In particular, previous acquisitions may be recorded and, by predictions based on past position and known satellite paths (which can be modeled), the current satellite position may be readily acquired. In this manner, preferred embodiments employ a reacquisition step, for reacquiring previously acquired satellites, prior to acquiring new satellites, for yet further potential reductions in computational complexity.

The presently disclosed embodiments are to be considered in all respects as illustrative and not restrictive. The scope of the invention being indicated by the appended claims, rather than the foregoing description, and all changes which come within the meaning and range of equivalency of the claims are, therefore, intended to be embraced therein.

What is claimed is:

1. An efficient process for acquiring multiple satellite signals having a common transmission frequency, each signal having a unique identification code, wherein a received signal frequency from each satellite is offset from the common transmission frequency due to a Doppler shift and receiver clock imprecision, said method comprising the steps of:

constructing probability distributions relating to the probable frequency of a subsequent satellite signal given one or more known satellite signal frequencies;

storing the probability distributions as statistical data;

acquiring a first satellite signal at a first received frequency;

using the first frequency in conjunction with the stored statistical data to establish a range of all possible frequencies that could correspond to the frequency of a second satellite signal and then constructing a first window within this range that limits the range to only those frequencies that are determined to have a sufficiently high probability of correspondence; and searching for a second satellite signal using a modified sample comparison approach within the range of frequencies defined by the first window.

2. The process of claim 1, wherein determining a sufficiently high probability for frequencies within the first window comprises:

making a system level determination that balances the time it takes to search the frequencies in the first window against the risk that the frequency of the subsequent satellite signal is not in the first window;

arriving at an acceptable minimum level of probability that the frequency of the subsequent satellite signal frequency is in the first window; and performing an analysis of the probability distribution to arrive at the required limits for the first window based on the acceptable minimum level of probability that the subsequent satellite signal frequency is contained within the first window.

3. The process of claim 1, wherein the construction of the probability distribution comprises:

calculating a maximum offset for the frequencies of the known satellite signals that is based on the maximum possible Doppler shift and the maximum possible clock imprecision;

using the known satellite frequencies and the maximum offset, relative to those frequencies, in the positive direction as one limit and the maximum possible offset in the negative direction as the other limit; and assigning probabilities, given the frequencies of the known satellites, that a given frequency within the range defined by the limits will correspond to the frequency of the subsequent satellite, wherein the probabilities are based on computer simulations or on real-life trials.

4. The process of claim 1, wherein acquiring the first satellite signal further comprises:

searching for the first satellite signal based on predetermined data or through an unmodified sample comparison procedure; and once a match is found, identifying the satellite that transmitted the signal and the frequency at which the signal was received.

5. The process of claim 1, further comprising the steps of:

acquiring a second satellite signal at a second received frequency within the first window;

using the second frequency in conjunction with the stored statistical data and the frequency of the first signal to establish a second range of all possible frequencies that could correspond to the frequency of a third satellite and then constructing a second window within this range that limits the range to only those frequencies that are determined to have sufficiently high probability of correspondence, wherein the second window is narrower than the first window; and searching for a third satellite signal using a modified sample comparison approach within a range of frequencies defined by the second window.

6. The process of claim 5, further comprising the steps of:

acquiring a third satellite signal at a third received frequency within the second window;

using the third frequency in conjunction with the stored statistical data, the frequency of the first signal, and the frequency of the second signal to establish a third range of all possible frequencies that could correspond to the frequency of a fourth satellite and then constructing a third window within this range that limits the range to only those frequencies that are determined to have sufficiently high probability of correspondence, wherein the third window is narrower than the second window; and searching for a fourth satellite signal using a modified sample comparison approach within a range of frequencies defined by the third window;

acquiring a fourth satellite signal at a fourth received frequency within the third window.

7. A satellite receiver comprising a satellite signal acquisition engine for acquiring multiple satellite signals having a common transmission frequency, each signal having a unique identification code, wherein a received signal frequency from each satellite is offset from the common transmission frequency due to a Doppler shift and receiver clock imprecision, said system comprising:

a storage device coupled to said receiver for storing statistical data related to the probable frequency of a subsequent satellite signal given one or more known satellite signal frequencies and the offset imposed by the Doppler shifts and the receiver clock imprecision;

a statistical processor coupled to said receiver for constructing search windows based on one or more known satellite signal frequencies and the stored statistical data; and a searcher for enabling the receiver to search for a subsequent satellite signal using a modified sample comparison approach within a range of frequencies defined by the search windows.

8. The receiver of claim 7 wherein the search windows are limited to those frequencies that exhibit a sufficiently high probability of corresponding to the frequency of the subsequent satellite signal based on a system level determination of the minimum acceptable probability the subsequent satellite signal frequency is contained within a given window.

9. The receiver of claim 7, wherein the receiver further comprises a communication link for communicating with a navigation engine, wherein the navigation engine can be any navigation engine used in GPS or any other satellite tracking and positioning system or a custom engine built for a specific application.

10. The receiver of claim 9, wherein the communication link is a wireless link.

11. An autonomous, highly portable satellite position determination system comprising:

a navigation module comprising a navigation engine; and a receiver module comprising a satellite signal acquisition engine for acquiring multiple satellite signals having a common transmission frequency, each signal having a unique identification code, wherein a received signal frequency from each satellite is offset from the common transmission frequency due to a Doppler shift and a receiver clock imprecision, said receiver comprising:

a storage device coupled to said receiver for storing statistical data related to the probable frequency of a subsequent satellite signal given one or more known satellite signal frequencies and the offset imposed by the Doppler shifts and receiver clock imprecision;

a statistical processor coupled to said receiver for constructing search windows based on one or more known satellite signal frequencies and the stored statistical data; and a searcher for enabling the receiver to search for a subsequent satellite signal using a modified sample comparison approach within a range of frequencies defined by the search windows.

12. The system of claim 11, wherein the receiver and the navigation engine communicate over a wireless link thus enabling the receiver module and the navigation module to be located separately from each other.

13. The system of claim 12, wherein the distribution of functions between the receiver module and the navigation module and the modified sample comparison approach allow for a miniaturization of the receiver module making the system highly portable.

14. The system of claim 13, wherein the receiver clock is also remotely located from the receiver allowing for further miniaturization of the receiver module.

* * * * *